(12) United States Patent
Johnston et al.

(10) Patent No.: US 11,869,221 B2
(45) Date of Patent: Jan. 9, 2024

(54) DATA COMPRESSION USING INTEGER NEURAL NETWORKS

(71) Applicant: Google LLC, Mountain View, CA (US)

(72) Inventors: Nicholas Johnston, San Jose, CA (US); Johannes Balle, San Francisco, CA (US)

(73) Assignee: Google LLC, Mountain View, CA (US)

( * ) Notice: Subject to any disclaimer, the term of this patent is extended or adjusted under 35 U.S.C. 154(b) by 453 days.

(21) Appl. No.: 17/274,596

(22) PCT Filed: Sep. 18, 2019

(86) PCT No.: PCT/US2019/051624
§ 371 (c)(1),
(2) Date: Mar. 9, 2021

(87) PCT Pub. No.: WO2020/068498
PCT Pub. Date: Apr. 2, 2020

(65) Prior Publication Data
US 2021/0358180 A1    Nov. 18, 2021

Related U.S. Application Data

(60) Provisional application No. 62/737,852, filed on Sep. 27, 2018.

(51) Int. Cl.
*G06T 9/00* (2006.01)
*G06F 17/18* (2006.01)
(Continued)

(52) U.S. Cl.
CPC .............. *G06T 9/002* (2013.01); *G06F 17/18* (2013.01); *G06N 3/045* (2023.01); *G06N 3/084* (2013.01)

(58) Field of Classification Search
CPC ......... G06T 9/002; G06F 17/18; G06N 3/045; G06N 3/084; G06N 3/063
See application file for complete search history.

(56) References Cited

U.S. PATENT DOCUMENTS 7,315,822 B2   1/2008  Li
10,824,943 B2*  11/2020  Tong ...................... G06N 3/048
(Continued)

OTHER PUBLICATIONS

Agustsson et al., "Soft-to-hard vector quantization for end-to-end learning compressible representations," arXiv preprint arXiv:1704.00648, Apr. 2017, 16 pages.
(Continued)

*Primary Examiner* — Bobbak Safaipour
(74) *Attorney, Agent, or Firm* — Fish & Richardson P.C.

(57) ABSTRACT

Methods, systems, and apparatus, including computer programs encoded on a computer storage medium, for reliably performing data compression and data decompression across a wide variety of hardware and software platforms by using integer neural networks. In one aspect, there is provided a method for entropy encoding data which defines a sequence comprising a plurality of components, the method comprising: for each component of the plurality of components: processing an input comprising: (i) a respective integer representation of each of one or more components of the data which precede the component in the sequence, (ii) an integer representation of one or more respective latent variables characterizing the data, or (iii) both, using an integer neural network to generate data defining a probability distribution over the predetermined set of possible code symbols for the component of the data.

20 Claims, 9 Drawing Sheets

(51) Int. Cl.
  *G06N 3/084* (2023.01)
  *G06N 3/045* (2023.01)

(56) References Cited

U.S. PATENT DOCUMENTS

| | | | |
|---|---|---|---|
| 2019/0340486 A1* | 11/2019 | Mills | G06F 7/5443 |
| 2019/0356330 A1* | 11/2019 | Minnen | G06N 7/01 |
| 2020/0027247 A1* | 1/2020 | Minnen | G06T 9/002 |
| 2020/0311554 A1* | 10/2020 | Asai | G06N 3/084 |
| 2021/0157283 A1* | 5/2021 | Abeloe | G06F 21/55 |
| 2021/0192327 A1* | 6/2021 | Li | G06N 3/063 |
| 2021/0224653 A1* | 7/2021 | Ioffe | G06F 18/10 |
| 2021/0374345 A1* | 12/2021 | Raman | G06N 3/04 |

OTHER PUBLICATIONS

Alemi et al., "Fixing a broken ELBO," International Conference on Machine Learning, Jul. 2018, 159-168.

Asuni et al., "TESTIMAGES: a Large-scale Archive for Testing Visual Devices and Basic Image Processing Algorithms," STAG, Sep. 2014, 8 pages.

Ballé et al., "Efficient nonlinear transforms for lossy image compression," 2018 Picture Coding Symposium, Jun. 2018, 6 pages.

Ballé et al., "Integer networks for data compression with latent-variable models," International Conference on Learning Representations, Sep. 2018, 10 pages.

Ballé et al., "Variational image compression with a scale hyperprior," arXiv preprint arXiv:1802.01436, Feb. 2018, 23 pages.

Baluja et al., "No Multiplication? No Floating Point? No Problem! Training Networks for Efficient Inference," arXiv preprint arXiv:1809.09244, Sep. 2018, 13 pages.

Compression.cc [online], "CLIC: Challenge on Learned Image Compression," 2018, retrieved on Jun. 4, 2021, retrieved from URL<http://www.compression.cc/2018/challenge>, 1 pages.

Courbariaux et al., "Binary Net: Training deep neural networks with low precision multiplications," arXiv preprint arXiv:1412.7024, Dec. 2014, 10 pages.

Denton et al., "Exploiting linear structure within convolutional networks for efficient evaluation," Computer Vision and Pattern Recognition, arXiv preprint arXiv:1404.0736, Apr. 2014, 11 pages.

Han et al., "Deep compression: Compressing deep neural networks with pruning, trained quantization and huffman coding," arXiv preprint arXiv:1510.00149, Oct. 2015, 14 pages.

Higgins et al., "beta-vae: Learning basic visual concepts with a constrained variational framework," Conference Paper at ICLR, 2017, 22 pages.

Hubara et al., "Binarized neural networks," Proceedings of the 30th international conference on neural information processing systems, Dec. 2016, 9 pages.

Jacob et al., "Quantization and training of neural networks for efficient integer-arithmetic-only inference," Proceedings of the IEEE Conference on Computer Vision and Pattern Recognition, 2018, 10 pages.

Jang et al., "Categorical reparameterization with gumbel-softmax," arXiv preprint arXiv:1611.01144, Nov. 2016, 13 pages.

Kingma et al., "Auto-encoding variational bayes," arXiv preprint arXiv:1312.6114, Dec. 2013, 14 pages.

Klopp et al., "Learning a Code-Space Predictor by Exploiting Intra-Image-Dependencies," BMVC, 2018, 12 pages.

Kodak [online], "Kodak lossless true color image suite," 1993, retrieved on Mar. 10, 2021, retrieved from URL<http://r0k.us/graphics/kodak/>, 3 pages.

Marpe et al., "Context-based adaptive binary arithmetic coding in the H. 264/AVC video compression standard," IEEE Transactions on circuits and systems for video technology, Aug. 2003, 13(7):620-36.

Minnen et al., "Joint autoregressive and hierarchical priors for learned image compression," arXiv preprint arXiv:1809.02736, Sep. 2018, 22 pages.

Oord et al., "Neural discrete representation learning," arXiv preprint arXiv:1711.00937, Nov. 2017, 11 pages.

PCT International Search Report and Written Opinion in International Appln. No. PCT/US2019/051624, dated Dec. 18, 2019, 16 pages.

Rastegari et al., "Xnor-net: Imagenet classification using binary convolutional neural networks," European conference on computer vision, Oct. 2016, 17 pages.

Rissanen et al., "Langdon G. Universal modeling and coding," IEEE Transactions on Information Theory, Jan. 1981, 27(1):12-23.

Shannon et al., "A Mathematical Theory of Communication, " The Bell System Tech nical Journal 27.3, 1948, 44 pages.

Sønderby et al., Ladder variational autoencoders, arXiv preprint arXiv:1602.02282, Feb. 2016, 12 pages.

Theis et al., "Lossy image compression with compressive autoencoders," arXiv preprint arXiv:1703.00395, Mar. 2017, 19 pages.

Wu et al., "Training and inference with integers in deep neural networks," arXiv preprint arXiv:1802.04680, Feb. 2018, 14 pages.

* cited by examiner

DATA COMPRESSION USING INTEGER NEURAL NETWORKS

CROSS-REFERENCE TO RELATED APPLICATION

This application is a National Stage Application under 35 U.S.C. § 371 and claims the benefit of International Application No. PCT/US2019/051624, filed Sep. 18, 2019, which claims priority to U.S. Application No. 62/737,852, filed Sep. 27, 2018, the disclosure of which is incorporated herein by reference.

BACKGROUND

This specification relates to data compression.

Compressing data refers to determining a representation of the data that occupies less space in a memory. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

SUMMARY

This specification describes systems implemented as computer programs on one or more computers in one or more locations that can reliably perform data compression and data decompression across a wide variety of hardware and software platforms by using integer neural networks.

According to an aspect there is provided a method performed by one or more data processing apparatus for entropy encoding data which defines a sequence comprising a plurality of components, wherein each component specifies a respective code symbol from a predetermined discrete set of possible code symbols, the method comprising: for each component of the plurality of components: processing an input comprising: (i) a respective integer representation of each of one or more components of the data which precede the component in the sequence, (ii) an integer representation of one or more respective latent variables characterizing the data, or (iii) both, using an integer neural network to generate data defining a probability distribution over the predetermined set of possible code symbols for the component of the data, wherein: the integer neural network has a plurality of integer neural network parameter values, and each of the plurality of integer neural network parameter values are integers; the integer neural network comprises a plurality of integer neural network layers, each integer neural network layer is configured to process a respective integer neural network layer input to generate a respective integer neural network layer output, and processing an integer neural network layer input to generate an integer neural network layer output comprises: generating an intermediate result by processing the integer neural network layer input in accordance with a plurality of integer neural network layer parameters using integer-valued operations; and generating the integer neural network layer output by applying an integer-valued activation function to the intermediate result; and generating an entropy encoded representation of the data using the respective probability distribution determined for each component of the plurality of components.

In some implementations, the predetermined set of possible code symbols may comprise a set of integer values.

In some implementations, the data may represent an image.

In some implementations, the data may represent a latent representation of an image generated by processing the image using a different integer neural network.

In some implementations, generating an entropy encoded representation of the data using the respective probability distribution determined for each component of the plurality of components may comprise using an arithmetic coding procedure to generate the entropy encoded representation of the data using the respective probability distribution determined for each component of the plurality of components.

In some implementations, generating an intermediate result by processing the integer neural network layer input in accordance with a set of integer neural network layer parameters using integer-valued operations may include generating a first intermediate result by multiplying the integer neural network layer input by an integer-valued parameter matrix or convolving the integer neural network layer input by an integer-valued convolutional filter.

In some implementations, the method may further include generating a second intermediate result by adding an integer-valued bias vector to the first intermediate result.

In some implementations, the method may further include generating a third intermediate result by dividing each component of the second intermediate result by an integer-valued rescaling factor, where the division is performed using a rounding division operation.

In some implementations, the integer-valued activation function may be defined by a look-up table that defines a mapping from each integer value in a predetermined set of integer values to a respective integer output.

In some implementations, the plurality of integer neural network parameter values of the integer neural network may be determined by a training procedure; and during training of the integer neural network, the integer neural network parameter values may be stored as floating point values, and the integer neural network parameter values stored as floating point values may be rounded to integer values before being used in computations. Rounding an integer neural network parameter value stored as a floating point value to an integer value may comprise: scaling the floating point value; and rounding the scaled floating point value to a nearest integer value. The floating point value may be transformed by a parameterization mapping prior to being scaled, wherein the parameterization mapping $r(\cdot)$ is defined by: $r(x) := \max(x, \sqrt{1+\epsilon^2})^2 - \epsilon^2$. The integer neural network parameter value may define a parameter of a convolutional filter, and the floating point value may be scaled by a factor s defined by: $s = (\max((-2^{K-1})^{-1}L, (2^{K-1}-1)^{-1}H), \epsilon)^{-1}$, where K is a bit-width of a kernel, L is a minimum of a set of floating point values defining parameters of the convolutional filter, H is a maximum of the set of floating point values defining the parameters of the convolutional filter, and $\epsilon$ is a positive constant. The floating point value may be scaled based on a bit-width of a convolution kernel.

In some implementations, the integer neural network may include an integer neural network layer which is configured to generate the integer neural network layer output by applying an integer-valued activation to the intermediate result, where the integer-valued activation function performs a clipping operation, and where during the training of the integer neural network, a gradient of the activation function is replaced by a scaled generalized Gaussian probability density.

In some implementations, the one or more respective latent variables characterizing the data may be generated by processing the data using a neural network.

In some implementations, for each of the plurality of components, the probability distribution over the predetermined set of code symbols for the component may be a Gaussian distribution convolved with a uniform distribution, and the data defining the probability distribution over the predetermined set of code symbols for the component may comprise respective mean and standard deviation parameters of the Gaussian distribution.

According to another aspect, there is provided a method for entropy decoding data which defines a sequence including a set of components, where each component specifies a respective code symbol from a predetermined discrete set of possible code symbols. The method includes obtaining an entropy encoded representation of the data; generating a respective reconstruction of each component of the data from the entropy encoded representation of the data, including, for each component of the data: determining a respective probability distribution over the predetermined set of possible code symbols; and entropy decoding the component of the data using the respective probability distribution over the predetermined set of possible code symbols.

For each component, determining the respective probability distribution over the predetermined set of possible code symbols includes: processing an input including: (i) a respective integer representation of each of one or more previously determined components of the data which precede the component in the sequence of components, (ii) an integer representation of one or more respective latent variables characterizing the data, or (iii) both, using an integer neural network to generate data defining the respective probability distribution over the predetermined set of possible code symbols. The integer neural network has a set of integer neural network parameter values, and each of the integer neural network parameter values are integers. The integer neural network includes a set of integer neural network layers, each integer neural network layer is configured to process a respective integer neural network layer input to generate a respective integer neural network layer output, and processing an integer neural network layer input to generate an integer neural network layer output includes: generating an intermediate result by processing the integer neural network layer input in accordance with a set of integer neural network layer parameters using integer-valued operations; and generating the integer neural network layer output by applying an integer-valued activation function to intermediate result.

In some implementations, the data may represent a latent representation of an image generated by processing the image using a different integer neural network.

In some implementations, entropy decoding a component of the data using the respective probability distribution over the predetermined set of possible code symbols may include using an arithmetic decoding procedure to entropy decode the component of the data using the respective probability distribution over the predetermined set of possible code symbols.

According to a further aspect, there is provided a system comprising one or more computers and one or more storage devices storing instructions that when executed by the one or more computers cause the one or more computers to perform the operations of the above method aspects.

According to another aspect, there is provided one or more computer storage media storing instructions that when executed by one or more computers cause the one or more computers to perform the operations of the above method aspects.

It will be readily appreciated that features described in the context of one aspect may be combined with other aspects.

Particular embodiments of the subject matter described in this specification can be implemented so as to realize one or more of the following advantages.

This specification describes a data compression system that compresses data by processing the data using one or more neural networks to generate an entropy model, and then using the entropy model to entropy encode the data. An "entropy model" specifies a respective code symbol probability distribution (i.e., probability distribution over the set of possible code symbols, e.g., integers) for each code symbol in an ordered collection of code symbols representing the data, as will be described in more detail below. A decompression system can decompress the data by reproducing the entropy model using one or more neural networks, and then using the entropy model to entropy decode the data.

Generally, the compression and decompression systems may operate on different hardware or software platforms, e.g., that use different implementations of floating point arithmetic and numerical round-off operations. Therefore, performing operations using floating point arithmetic may result in the decompression system computing an entropy model which is slightly different than the entropy model computed by the compression system. However, for data compressed by the compression system to be reliably reconstructed by the decompression system, the compression system and the decompression system must use identical entropy models. Even slight differences between the respective entropy models used by the compression and decompression systems can result in catastrophic decoding failures, e.g., where the data reconstructed by the decompression system is substantially different from the data that was compressed by the compression system.

The compression and decompression systems described in this specification each compute the entropy model using integer neural networks, i.e., neural networks that implement all operations using integer arithmetic, look-up tables, or both. Integer neural networks can operate deterministically across different hardware and software platforms, i.e., independently of how different platforms implement floating point arithmetic and numerical round-off operations. Therefore, using integer neural networks enables the compression and decompression systems to compute identical entropy models independently of hardware and software platform, and thereby allows the compression and decompression systems to operate reliably across different hardware and software platforms, i.e., by reducing the likelihood of catastrophic decoding failures.

In addition to increasing the reliability of the compression and decompression systems, using integer neural networks may have a minimal impact on the performance (e.g., the rate-distortion performance) of the compression and decompression systems, i.e., relative to using floating point neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
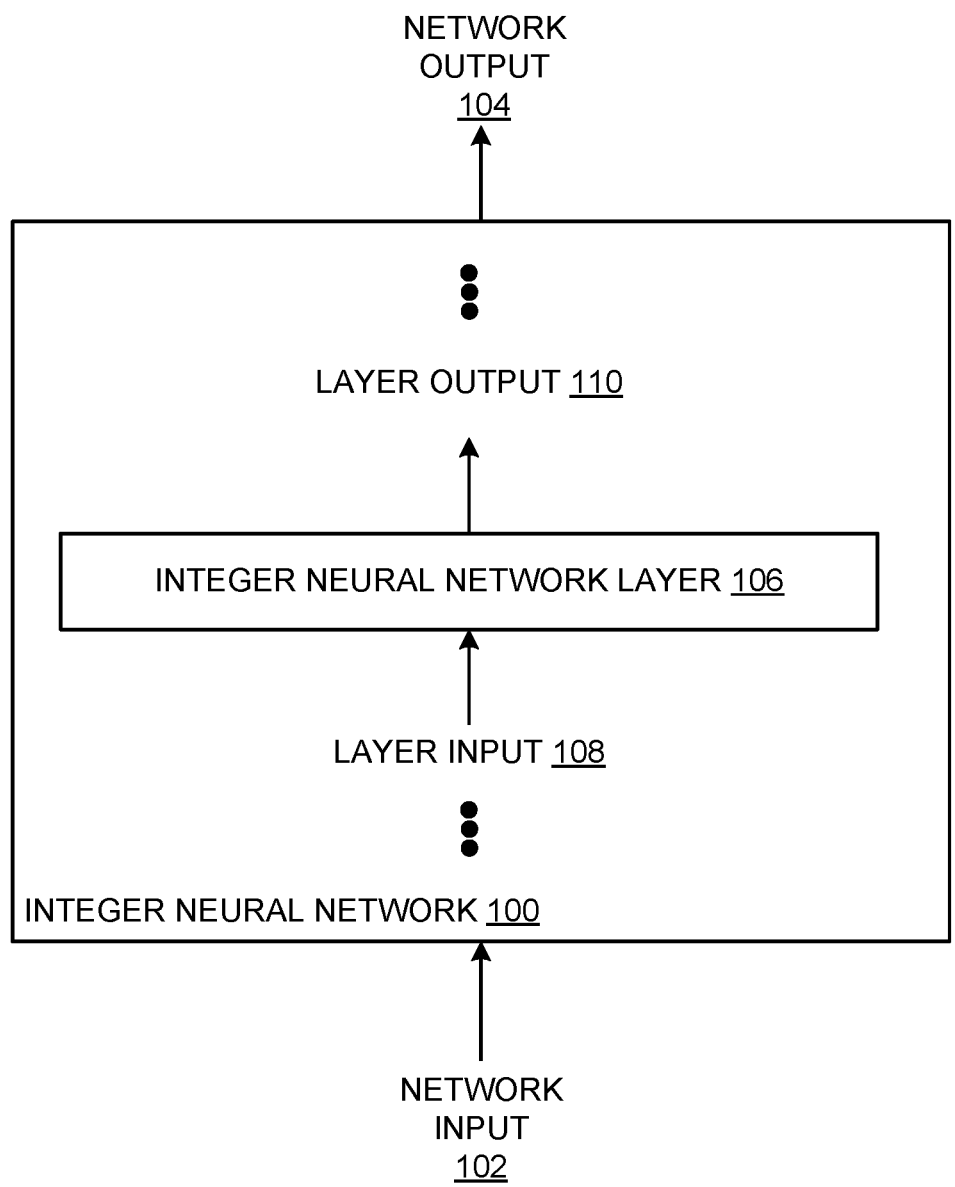
FIG. 1 shows an example integer neural network.

This specification describes a compression system and a decompression system that can operate reliably across a wide variety of hardware and software platforms by using integer neural networks, i.e., neural networks that implement all operations using integer arithmetic, look-up tables, or both.

The compression system compresses data (e.g., image data, video data, audio data, text data, or any other appropriate sort of data) represented by an ordered collection of code symbols (e.g. integer values) by entropy encoding (e.g., arithmetic coding or Huffman coding) the code symbols using an entropy model. As used throughout this document, a "code symbol" refers to an element drawn from a discrete set of possible elements, e.g., integer values. The entropy model defines a respective code symbol probability distribution (i.e., probability distribution over the set of possible code symbols) corresponding to each code symbol in the ordered collection of code symbols representing the data. The decompression system can entropy decode the data using the same entropy model as the compression system.

Generally, the compression system can compress data more effectively by using a "conditional" entropy model, that is, an entropy model that is dynamically computed based on the data being compressed, rather than, e.g., a predefined entropy model. The decompression system must also dynamically compute the entropy model in order to decompress the data. Generally, the compression and decompression systems may operate on different hardware or software platforms, e.g., that implement floating point arithmetic and numerical round-off operations differently, which can cause the compression and decompression systems to compute different entropy models. In one example, the compression system may be implemented in a data center, while the decompression system may be implemented on a user device. However, for data compressed by the compression system to be reliably reconstructed by the decompression system, the compression system and the decompression system must use identical entropy models. Even slight differences between the respective entropy models used by the compression and decompression systems can result in catastrophic decoding failures.

The compression and decompression systems described in this specification compute the entropy model used to entropy encode/decode the data using integer neural networks that operate deterministically across hardware and software platforms. Therefore, the compression and decompression systems described in this specification can operate reliably across different hardware and software platforms with a greatly reduced risk of decoding failures resulting from differences between the entropy models used to entropy encode/decode the data.

As used throughout this document, the term integer arithmetic refers to basic arithmetic operations (e.g., addition, subtraction, multiplication, and division) that are applied to integer inputs to generate integer outputs. In the case of division, any fractional part of the result of the division may be ignored or rounded to ensure that the output is integer-valued. As used throughout this document, a look-up table refers to a data structure that stores data defining a mapping from each input value in a predetermined set of input values to a precomputed output value.

Generally, the compression and decompression systems may be co-located or remotely located, and compressed data generated by the compression system can be provided to the decompression system in any of a variety of ways. For example, the compressed data may be stored (e.g., in a physical data storage device or logical data storage area), and then subsequently retrieved from storage and provided to the decompression system. As another example, the compressed data may be transmitted over a communications network (e.g., the Internet) to a destination, where it is subsequently retrieved and provided to the decompression system.

The compression system can be used to compress any appropriate sort of data, e.g., image data, audio data, video data, or text data.

These features and other features are described in more detail below.

FIG. 1 shows an example integer neural network 100 that can be implemented as computer programs on one or more computers in one or more locations. The integer neural network 100 is configured to process an integer-valued network input 102 using operations implemented by integer arithmetic, look-up tables, or both, to generate an integer-valued network output 104. A compression system (e.g., as described with reference to FIG. 4) and a decompression system (e.g., as described with reference to FIG. 5) can use integer neural networks (e.g., the integer neural network 100) to reliably compute identical entropy models despite operating on different hardware or software platforms.

The integer neural network 100 processes the network input 102 using one or more integer neural network layers (e.g., the integer neural network layer 106) to generate the network output 104. Generally, the network input 102 and the network output 104 can be represented as ordered collections of integer values, e.g., vectors or matrices of integer values.

Each integer neural network layer 106 is configured to process an integer-valued layer input 108 using operations implemented by integer arithmetic, look-up tables, or both, to generate an integer-valued layer output 110. For example, the integer neural network layer 106 may process a layer input u to generate a layer output w in accordance with the operations:

$$v=(Hu+b)\oslash c \quad (1)$$

$$w=g(v) \quad (2)$$

where, in order: a linear transform H is applied to the layer input u, a bias vector b is added, the result is divided element-wise by a vector c to yield an intermediate result v, and an element-wise non-linearity (activation function) $g(\cdot)$ is applied to the intermediate result v to generate the layer output w. The integer neural network layer parameters H, b, and c, as well as all intermediate results, are all defined as integers. For the intermediate result v to be defined as an integer, the element-wise division operation $\oslash$ can be implemented as a rounding division operation (equivalent to division followed by rounding to the nearest integer). In programming languages such as C, this can be implemented with integer operands m and n as:

$$m\oslash n=(m+n\backslash\backslash 2)\backslash\backslash n \quad (3)$$

where \\ is the floor division operation.

The form of the linear transform H referred to in equation (1) depends on the type of the integer neural network layer. In one example, the integer neural network layer may be a fully-connected layer, and the linear transform H may be implemented as a matrix multiplication, i.e., that transforms the layer input u by multiplying it by a matrix of integer-valued parameters. In another example, the integer neural network layer may be a convolutional layer, and the linear transform H may be implemented as a convolution operation, i.e., that transforms the layer input u by convolving it with one or more integer-valued convolution kernels. Generally, applying the linear transform H to the layer input u involves matrix multiplication or convolution operations that can increase the likelihood of integer overflow of the intermediate result v. Dividing by the parameters c (which is optional) may reduce the likelihood of integer overflow of the intermediate result v.

The non-linearity $g(\cdot)$ referred to in equation (2) can be implemented in any of a variety of ways. In one example, the non-linearity $g(\cdot)$ may be a rectified linear unit (ReLU) non-linearity that clips the value of intermediate result v to a predetermined range, e.g.:

$$g_{QReLU}(v)=\max(\min(v,255),0) \quad (4)$$

where, in this example, $g(\cdot)$ clips the value of the intermediate result v to the range [0,255]. In another example, the non-linearity $g(\cdot)$ may be a hyperbolic tangent non-linearity, e.g.:

$$g_{Qtanh}(v) = Q\left(7\tanh\left(\frac{v}{15}\right)\right) \quad (5)$$

where $Q(\cdot)$ represents the quantization operator that rounds its input to the nearest integer value. In this example, the hyperbolic tangent non-linearity may be represented by a look-up table to ensure that its outputs are independent of the implementation of the hyperbolic tangent function on any particular platform.

In some cases, the non-linearity $g(\cdot)$ may be scaled to cause its range to match the bit width used to represent the integer layer output. The bit width of an integer refers to the number of digits (e.g., binary digits) used to represent the integer. In one example, the integer layer output may be a signed integer with a bit width of 4 binary digits, meaning that it can assume integer values in the range −7 to 7, and the non-linearity $g(\cdot)$ may be scaled to generate integer outputs in the range −7 to 7, e.g., as in equation (5). Scaling the non-linearity $g(\cdot)$ to cause its range to match the bit width of the integer layer output can enable the integer layer to generate richer layer outputs by maximizing usage of the dynamic range of the layer output.

The learned parameters and the (intermediate) outputs of the integer neural network layer 106 can be represented using any appropriate integer number format. For example, referring to equations (1)-(2), the learned parameters and the (intermediate) outputs of the integer neural network layer 106 may have the format:

H: 8 bit signed integers
b, v: 32 bit signed integers
c: 32 bit unsigned integers
w: 8 bit unsigned integers The integer neural network 100 can have any appropriate neural network architecture. Example architectures of integer neural networks used by a compression system (described with reference to FIG. 4) and a decompression system (described with reference to FIG. 5) are described in more detail with reference to FIG. 6.

During training, the parameter values of the integer neural network are iteratively adjusted to optimize an objective function, e.g., a rate-distortion objective function, as described in more detail below with reference to equation (15)-(18). More specifically, at each of multiple training iterations, the parameter values of the integer neural network can be adjusted using gradients of an objective function with respect to the parameters of the integer neural network based on a gradient descent optimization procedure (e.g., Adam). To effectively accumulate small gradient signals during training, the integer neural network parameters are stored as floating point values, but are mapped (rounded) to integer values before being used in computations. That is, at each training iteration, the floating point representations of the integer neural network parameters are mapped to integer values before being used to compute the integer neural network parameter value updates for the training iteration. A few examples of mapping floating point representations of the integer neural network parameters H, b, and c (described with reference to equation (1)) to integer representations are described next.

In one example, the integer-valued bias vector parameters b may be obtained by mapping the floating point-valued bias vector parameters b' as:

$$b=Q(2^K b') \quad (6)$$

where K is the bit width of the integer representation b, and $Q(\cdot)$ represents the quantization operator that rounds its input to the nearest integer value. Scaling the floating point-valued bias vector parameters b' by $2^K$ can enable the integer layer to generate richer layer outputs by maximizing usage of the dynamic range of the integer-valued bias vector parameters b.

In another example, the integer-valued division parameters c may be obtained by mapping the floating point-valued division parameters c' as:

$$c = Q(2^K r(c'))  \quad (7)$$

$$r(c') := \max(c', \sqrt{1+\epsilon^2})^2 - \epsilon^2 \quad (8)$$

where K is the bit width of the integer representation c, and Q(·) represents the quantization operator that rounds its input to the nearest integer value. In this example, the parameterization mapping r(·) ensures that values of c are always positive while gracefully scaling down gradient magnitudes on c' near zero, which can reduce the likelihood of perturbations in c' causing large fluctuations of the intermediate result v (particularly when c' is small).

In another example, the linear transform H may be a convolution transform defined by $H = [h_1, h_2, \ldots, h_N]$ (i.e., where each $h_i$ is a respective convolution filter that is defined, e.g., by a two-dimensional (2D) or three-dimensional (3D) array of integer values), and the floating point-valued linear transform parameters $H' = [h'_1, h'_2, \ldots, h'_N]$ may be mapped to the integer-valued linear transform parameters H as:

$$h_i = Q(s(h'_i)), i = 1, \ldots, N \quad (9)$$

$$s(h') = (\max((-2^{K-1})^{-1} L, (2^{K-1}-1)^{-1} H), \epsilon)^{-1} \quad (10)$$

where Q(·) represents the quantization operator that rounds its input to the nearest integer value, K is the bit width each component of the integer representation of the convolution filters, L is the minimum floating point value in the convolution filter h', H is the maximum floating point value in the convolution filter h', and $\epsilon$ is a positive constant. In this example, the scaling parameters rescales each convolution filter such that at least one of its minimum and maximum parameter values hits one of the dynamic range bounds ($-2^{K-1}$ and $2^{K-1}-1$), while keeping zero at zero. This represents the finest possible quantization of the convolution filter given its floating point representation, and thus maximizes accuracy. The positive constant E reduces instabilities and errors from division by zero.

During training, gradients of the objective function are computed with respect to the floating point-valued parameters of the integer neural network. However, in some cases, the gradients cannot be directly computed as a result of certain operations performed by the integer neural network being non-differentiable. In these cases, approximations to the gradients of non-differentiable operations can be applied to enable training of the integer neural network. A few examples of such approximations follow.

In one example, the mapping from the floating point-values to the integer values of the integer neural network parameters uses a non-differentiable quantization operator, e.g., as described with reference to equations (6), (7), and (9). In this example, the gradient of the quantization operator may be replaced by the identity function. In particular, referring to equations (6), (7), and (9), the gradients may be computed as:

$$\frac{\partial b}{\partial b'} := 2^K, \frac{\partial c}{\partial c'} := 2^K r'(c'), \frac{\partial h_i}{\partial h'_i} := s(h'_i)^{-1} \quad (11)$$

where ∂ represents the partial derivative operator. In the example illustrated by equation (11), the scaling parameter $s(h'_i)^{-1}$ is treated as if it were a constant (i.e., despite depending on $h'_i$).

In another example, the rounding division operation Ø (described with reference to equation (1)) is non-differentiable. In this example, the gradient of the rounding division operation may be replaced by the gradient of the floating point division operation.

In another example, the non-linearity (activation function) g(·) (referring to equation (2)) may be non-differentiable, and gradients of the non-linearity may be replaced by gradients of a continuous function that approximates the non-linearity. In a particular example, the non-linearity may be a quantized ReLU, as described with reference to equation (4), and the gradient of the non-linearity may be replaced by a scaled generalized Gaussian probability density with shape parameter β, e.g., given by:

$$\frac{\partial g_{QReLU}(v)}{\partial v} := \exp\left(-\alpha^\beta \left|\frac{2v}{2^K - 1} - 1\right|^\beta\right) \quad (12)$$

where ∂ represents the partial derivative operator, $$\alpha = \frac{1}{\beta} \Gamma\left(\frac{1}{\beta}\right),$$

and K is the bit width of the integer layer output.

After training is completed, the integer-valued network parameters (e.g., H, b, and c, as described with reference to equation (1)) are computed from the corresponding floating point-valued network parameters one more time (e.g., in accordance with equations (6)-(10)). Thereafter, the integer-valued network parameters can be used for inference, e.g., for use in computing entropy models used by compression/decompression systems, as will be described in more detail below.

Figure 2:
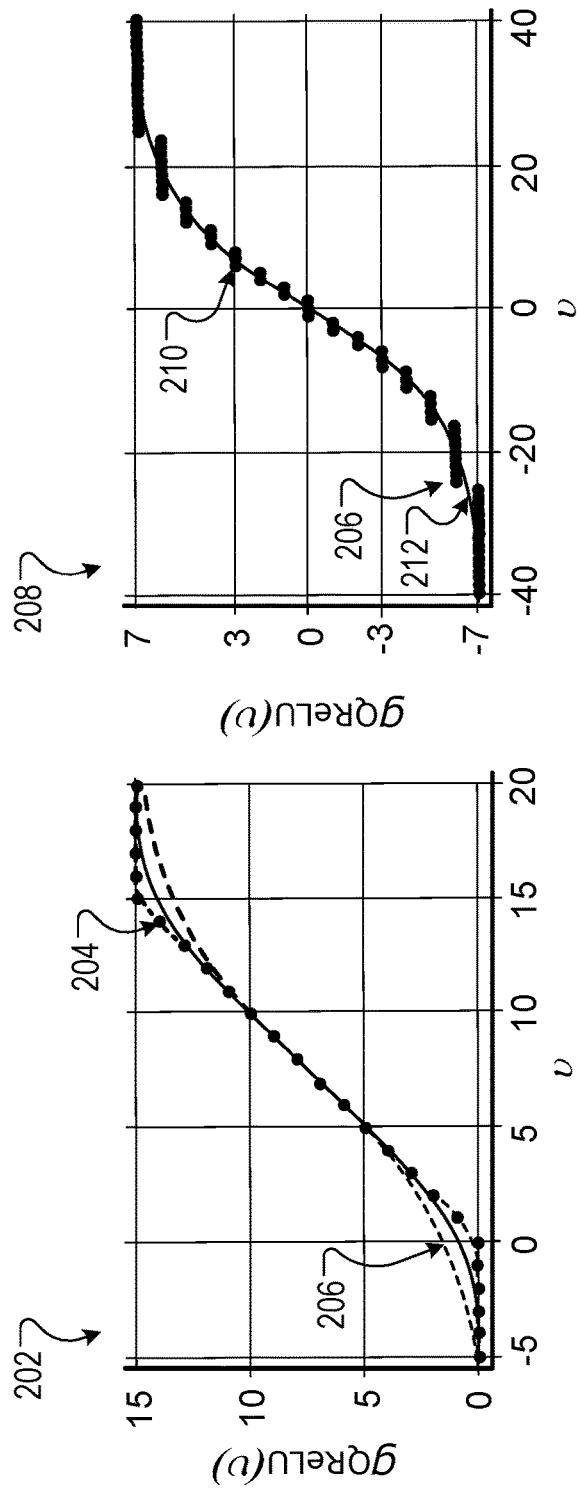
FIG. 2 illustrates examples of non-linearities (activation functions) that can be applied to an intermediate result of an integer neural network layer to generate the layer output.

FIG. 2 illustrates examples of non-linearities (activation functions) that can be applied to an intermediate result of an integer neural network layer to generate the layer output, e.g., as described with reference to equation (2). In particular, the graph 202 uses circles (e.g., the circle 204) to illustrate a quantized ReLU non-linearity $g_{QReLU}(v) = \max(\min(v, 15), 0)$ that clips integer values to the range [0,15]. This non-linearity can be implemented deterministically using either a look-up table or using a numerical clipping operation. Examples of scaled generalized Gaussian probability densities with different values of the shape parameter β are plotted along with the quantized ReLU, e.g., illustrated by the line 206. During training, the gradient of the quantized ReLU may be replaced by the gradient of a scaled generalized Gaussian probability density, as described earlier. The graph 208 uses circles (e.g., the circle 210) to illustrate a quantized hyperbolic tangent non-linearity $$g_{Qtanh}(v) = Q\left(7 \tanh\left(\frac{v}{15}\right)\right).$$

This non-linearity can be implemented deterministically using a look-up table. The corresponding continuous hyperbolic tangent non-linearity used for computing gradients is plotted along with the quantized hyperbolic tangent non-linearity, e.g., as illustrated by the line 212.

Figure 3:
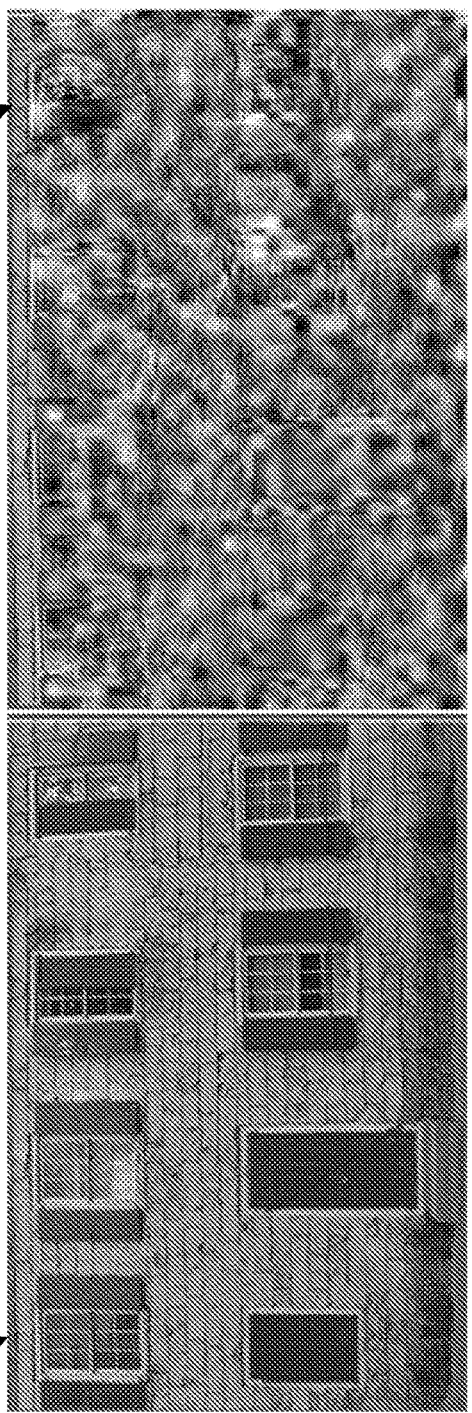
FIG. 3 illustrates the results of entropy decoding the same image using: (i) an entropy model computed using integer neural networks, and (ii) an entropy model computed using floating point arithmetic.

FIG. 3 illustrates the results of entropy decoding the same image using: (i) an entropy model computed using integer neural networks—302, and (ii) an entropy model computed using floating point arithmetic—304. When the entropy model is computed using floating point arithmetic, the image was initially decoded correctly (beginning in the top left corner), until floating point round-off error caused a small discrepancy between the respective entropy models computed by the compression and decompression systems, at which point the error propagated catastrophically, resulting in the image being decoded incorrectly.

Generally, a compression system can use one or more integer neural networks to determine an entropy model for entropy encoding an ordered collection of code symbols representing a set of data (e.g., image data, video data, or audio data). The ordered collection of code symbols representing the data can be obtained, e.g., by quantizing a representation of the data as an ordered collection of floating point values by rounding each floating point value to the nearest integer value. As described earlier, the entropy model specifies a respective code symbol probability distribution corresponding to each component (code symbol) of the ordered collection of code symbols representing the data. The compression system can generate the code symbol probability distribution for each component of the ordered collection of code symbols by using one or more integer neural networks to process: (i) an integer representation of one or more preceding code symbols, (ii) an integer representation of one or more latent variables characterizing the data, or (iii) both. The "latent variables" characterizing the data refer to an alternative representation of the data, e.g., that is generated by processing the data using one or more neural networks.

Figure 4:
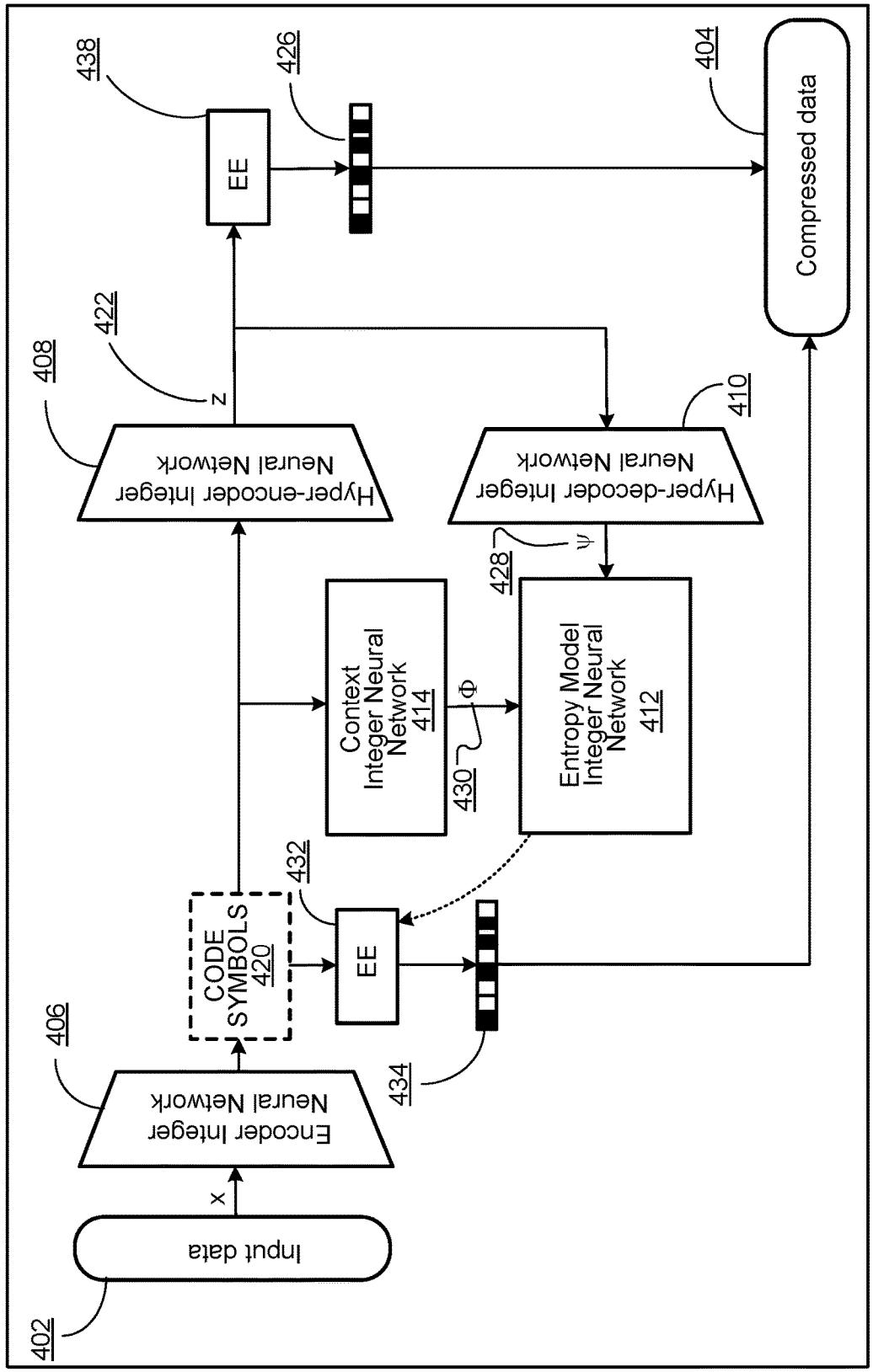
FIG. 4 is a block diagram of an example compression system that entropy encodes a set of data using an entropy model that is computed using integer neural networks.

FIG. 4 is a block diagram of an example compression system 400 that entropy encodes a set of data using an entropy model that is computed by integer neural networks. The compression system 400 is an example system implemented as computer programs on one or more computers in one or more locations in which the systems, components, and techniques described below are implemented. The compression system 400 is provided for illustrative purposes only, and generally, various components of the compression system 400 are optional, and other architectures of the compression system are possible.

The compression system 400 processes the input data 402 to generate compressed data 404 representing the input data 402 using: (1) an encoder integer neural network 406, (2) a hyper-encoder integer neural network 408, (3) a hyper-decoder integer neural network 410, (4) an entropy model integer neural network 412, and optionally, (5) a context integer neural network 414. The integer neural networks used by the compression system are jointly trained (along with integer neural networks used by the decompression system) using a rate-distortion objective function, as will be described in more detail with reference to FIG. 5. Generally, each integer neural network described in this document can have any appropriate integer neural network architecture that enables it to perform its described function. Example architectures of the integer neural networks used by the compression and decompression systems are described in more detail with reference to FIG. 6.

The encoder integer neural network 406 is configured to process a quantized (integer) representation of the input data 402 (x) to generate an ordered collection of code symbols (integers) 420 representing the input data. In one example, the input data may be an image, the encoder integer neural network 406 may be a convolutional integer neural network, and the code symbols 420 may be a multi-channel feature map output by the final layer of the encoder integer neural network 406.

The compression system 400 uses the hyper-encoder integer neural network 408, the hyper-decoder integer neural network 410, and the entropy model integer neural network 412 to generate a conditional entropy model for entropy encoding the code symbols 420 representing the input data, as will be described in more detail next.

The hyper-encoder integer neural network 408 is configured to process the code symbols 420 to generate a set of latent variables (characterizing the code symbols) that is referred to as a "hyper-prior" 422 (z) (sometimes called a "hyper-parameter"). In one example, the hyper-encoder integer neural network 408 may be a convolutional integer neural network, and the hyper-prior 422 may be a multi-channel feature map output by the final layer of the hyper-encoder integer neural network 408. The hyper-prior implicitly characterizes an input data-dependent entropy model that will enable the code symbols 420 representing the input data to be efficiently compressed.

The compressed data 404 generally includes a compressed representation of the hyper-prior 422 to enable the decompression system to reproduce the conditional entropy model. To this end, the compression system 400 generates a compressed representation 426 of the hyper-prior 422, e.g., as a bit string, i.e., a string of binary digits. In one example, the compression system 400 compresses the hyper-prior 422 using the entropy encoding engine 438 in accordance with a predetermined entropy model that specifies one or more predetermined code symbol probability distributions.

The hyper-decoder integer neural network 410 is configured to process the hyper-prior 422 to generate a hyper-decoder output 428 (Ψ), and the entropy model integer neural network 412 is configured to process the hyper-decoder output 428 to generate the conditional entropy model. That is, the hyper-decoder 410 and the entropy model integer neural network 412 jointly decode the hyper-prior to generate an output that explicitly defines the conditional entropy model.

The conditional entropy model specifies a respective code symbol probability distribution corresponding to each code symbol 420 representing the input data. Generally, the output of the entropy model integer neural network 412 specifies distribution parameters that define each code symbol probability distribution of the conditional entropy model. In one example, each code symbol probability distribution of the conditional entropy model may be a Gaussian distribution (parameterized by mean and standard deviation parameters) convolved with a unit uniform distribution. In this example, the output of the entropy model integer neural network 412 may specify the mean parameters $\{\mu_i\}_{i=1}^N$ and the standard deviation parameters $\{\sigma_i\}_{i=1}^N$ of the Gaussian distributions as:

$$\mu_i = \exp\left(\log(\mu_{min}) + \frac{\log(\mu_{max}) - \log(\mu_{min})}{L-1}\theta_i^\mu\right), i = 1, \ldots, N \quad (13)$$

$$\sigma_i = \exp\left(\log(\sigma_{min}) + \frac{\log(\sigma_{max}) - \log(\sigma_{min})}{L-1}\theta_i^\sigma\right), i = 1, \ldots, N \quad (14)$$

where N is the number of code symbols in the ordered collection of code symbols 420 representing the input data, $\mu_{min}$ is the minimum allowable mean value, $\mu_{max}$ is the maximum allowable mean value, $\theta_i^\mu$ is an integer value output by the final layer of the entropy model integer neural network that has L possible values in the range [0, L−1], $\sigma_{min}$ is the minimum allowable standard deviation value, $\sigma_{max}$ is the maximum allowable standard deviation value, and $\theta_i^o$ is an integer value output by the final layer of the entropy model integer neural network that has L possible values in the range [0, L−1]. In this example, during training, gradients may be determined by backpropagating through the reformulation provided by equations (13) and (14). After training, the code symbol probability distributions may be represented by a look-up table by precomputing all possible code symbol probability values as a function of: (i) the code symbol, and (ii) the mean and standard deviation parameters.

Optionally, the compression system 400 can additionally use the context integer neural network 414 in determining the conditional entropy model. The context integer neural network 414 is configured to autoregressively process the code symbols 420 (i.e., in accordance with an ordering of the code symbols) to generate a respective integer "context output" 430 ($\Phi$) for each code symbol. The context output for each code symbol only depends on code symbols that precede the code symbol in the ordered collection of code symbols representing the input data, and not on the code symbol itself or on code symbols that follow the code symbol. The context output 430 for a code symbol can be understood as causal contextual information that can be used by the entropy model integer neural network 412 to generate a more accurate code symbol probability distribution for the code symbol.

The entropy model integer neural network 412 can process the context outputs 430 generated by the context integer neural network 414 (i.e., in addition to the hyper-decoder output 428) to generate the conditional entropy model. Generally, the code symbol probability distribution for each code symbol depends on the context output for the code symbol, and optionally, on context outputs for code symbols that precede the code symbol, but not on context outputs for code symbols that follow the code symbol. This results in a causal dependence of the conditional entropy model on the code symbols representing the input data which ensures that the decompression system can reproduce the conditional entropy model from the compressed data, as will be described in more detail with reference to FIG. 5.

In contrast to the hyper-prior 422, which must be included as side-information in the compressed data 404 (thereby adding to the total compressed file size), the autoregressive context integer neural network 414 provides a source of "free" information (discounting computational costs) as it does not require adding any side-information. Jointly training the context integer neural network 414 and the hyper-encoder integer neural network 408 enables the hyper-prior 422 to store information that is complementary to the context outputs 430 while avoiding information that can be accurately predicted using the context outputs 430.

The entropy encoding engine 432 is configured to compress the code symbols 420 representing the input data by entropy encoding them in accordance with the conditional entropy model. The entropy encoding engine 432 can implement any appropriate entropy encoding technique, e.g., an arithmetic coding technique, a range coding technique, or a Huffman coding technique. The compressed code symbols 434 may be represented in any of a variety of ways, e.g., as a bit string.

The compression system 400 generates the compressed data 404 based on: (i) the compressed code symbols 434, and (ii) the compressed hyper-prior 426. For example, the compression system may generate the compressed data by concatenating respective bit strings representing the compressed code symbols 434 and the compressed hyper-prior 426.

Optionally, the compression system 400 can determine the entropy model used to entropy encode the code symbols representing the data using the context integer neural network 414 but not the hyper-prior 422. In these cases, the compression system 400 does not use the hyper-encoder integer neural network 408 or the hyper-decoder integer neural network 410. Rather, the compression system 400 generates the entropy model by autoregressively processing the code symbols 420 representing the data using the context integer neural network 100 to generate context outputs 430, and then processing the context outputs 430 using the entropy model integer neural network 412.

Optionally, the encoder integer neural network 406 can be implemented using floating point arithmetic rather than integer arithmetic and look-up tables, i.e., the encoder neural network can be implemented as a conventional floating point neural network instead of as an integer neural network. The encoder neural network 406 is not used to compute the entropy model, and therefore implementing the encoder neural network 406 using floating point arithmetic does not affect the reproducibility of the entropy model by the decompression system. However, implementing the encoder neural network using floating point arithmetic may still result in the decompression system being unable to exactly reconstruct the original input data, while implementing the encoder neural network as an integer neural network can enable the decompression system to exactly reconstruct the original input data.

Generally, a decompression system can use one or more integer neural networks to reproduce the same entropy model that was computed by the compression system, and then use the entropy model to entropy decode the code symbols. More specifically, the decompression system can generate a code symbol probability distribution for each component of the ordered collection of code symbols by using one or more integer neural networks to process: (i) an integer representation of one or more preceding code symbols, (ii) an integer representation of one or more latent variables characterizing the data, or (iii) both. As a result of using integer neural networks, the decompression system can compute an entropy model that exactly matches the entropy model computed by the compression system, even if the compression and decompression systems operate on different hardware or software platforms (e.g., that use different implementations of floating point arithmetic).

Figure 5:
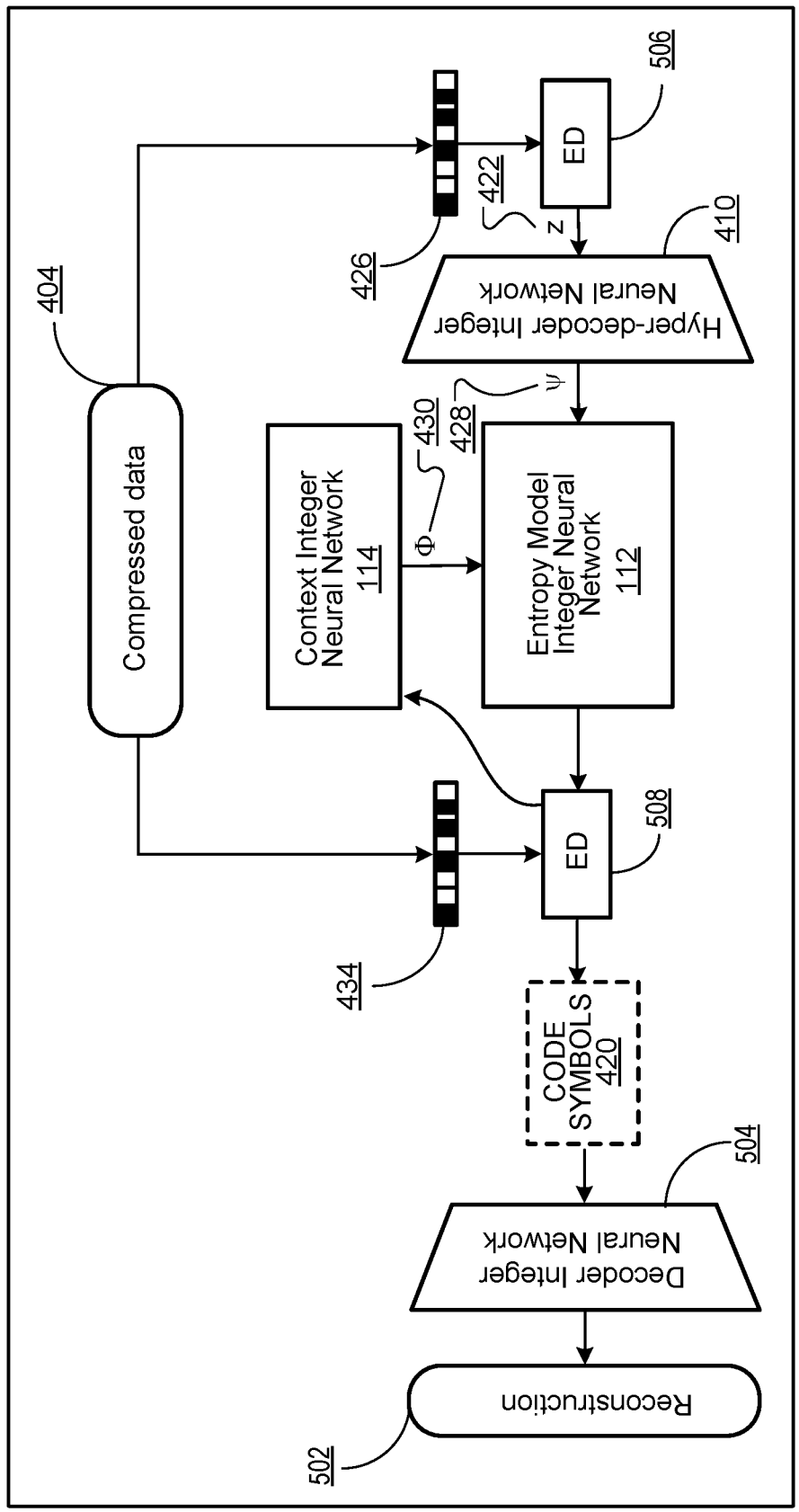
FIG. 5 is a block diagram of an example decompression system that entropy decodes a set of data using an entropy model that is computed using integer neural networks.

FIG. 5 is a block diagram of an example decompression system 500 that entropy decodes a set of data using an entropy model that is computed by integer neural networks. The decompression system 500 is an example system implemented as computer programs on one or more computers in one or more locations in which the systems, components, and techniques described below are implemented. The decompression system 500 is described here for illustrative purposes only, and generally, various components of the decompression system 500 are optional, and other architectures of the decompression system are possible.

The decompression system 500 processes the compressed data 404 generated by the compression system to generate a reconstruction 502 that approximates the original input data, using: (1) the hyper-decoder integer neural network 410, (2) the entropy model integer neural network 412, (3) a decoder integer neural network 504, and optionally, (4) the context integer neural network 414. The hyper-decoder integer neural network 410, the entropy model integer neural network 412, and the context integer neural network 414 used by the decompression system share the same parameter values as the corresponding integer neural networks used by the compression system.

To reproduce the conditional entropy model, the decompression system 500 obtains the hyper-prior 422 from the compressed data 404. For example, the decompression system 500 may obtain the hyper-prior 422 by using the entropy decoding engine 506 to entropy decode the compressed representation 426 of the hyper-prior 422 that is included in the compressed data 404. In this example, the entropy decoding engine 506 may entropy decode the compressed representation 426 of the hyper-prior 422 using the same (e.g., predetermined) entropy model that was used to entropy encode it.

The hyper-decoder integer neural network 410 is configured to process the quantized hyper-prior 422 to generate a hyper-decoder output 428 ($\Psi$), and the entropy model integer neural network 412 is configured to process the hyper-decoder output 428 to generate the conditional entropy model, i.e., in a similar manner to the compression system. The entropy decoding engine 208 is configured to entropy decode the compressed code symbols 434 included in the compressed data 404 in accordance with the conditional entropy model to recover the code symbols 420.

In cases where the compression system used the context integer neural network 414 to determine the conditional entropy model, the decompression system 500 also uses the context integer neural network 414 to reproduce the conditional entropy model. As described with reference to FIG. 4, the context integer neural network 414 is configured to autoregressively process the code symbols 420 representing the input data to generate a respective context output 430 for each code symbol. After initially receiving the compressed data 404, the decompression system 500 does not have access to the full set of decompressed code symbols 420 that are provided as inputs to the context integer neural network 414. As will be described in more detail below, the decompression system 500 accounts for this by sequentially decompressing the code symbols 420 in accordance with the ordering of the code symbols. The context outputs 430 generated by the context integer neural network 414 are provided to the entropy model integer neural network 412, which processes the context outputs 430 along with the hyper-decoder output 428 to generate the conditional entropy model.

To account for the decompression system 500 not initially having access to the full set of decompressed code symbols 420 that are provided as inputs to the context integer neural network 414, the decompression system 500 sequentially decompresses the code symbols 420 in accordance with the ordering of the code symbols. In particular, the decompression system may decompress the first code symbol using, e.g., a predetermined code symbol probability distribution. To decompress each subsequent code symbol, the context integer neural network 414 processes one or more preceding code symbols (i.e., that have already been decompressed) to generate a corresponding context output 430. The entropy model integer neural network 412 then processes the (i) context output 430, (ii) the hyper-decoder output 428, and optionally (iii) one or more preceding context outputs 430, to generate the corresponding code symbol probability distribution, which is subsequently used to decompress the code symbol.

The decoder integer neural network 504 is configured to process the ordered collection of code symbols 420 to generate the reconstruction 502 approximating the input data. That is, the operations performed by the decoder integer neural network 504 approximately invert the operations performed by the encoder integer neural network described with reference to FIG. 4.

The compression system and the decompression system can be jointly trained using machine learning training techniques (e.g., stochastic gradient descent) to optimize a rate-distortion objective function. More specifically, the encoder integer neural network, the hyper-encoder integer neural network, the hyper-decoder integer neural network, the context integer neural network, the entropy model integer neural network, and the decoder integer neural network can be jointly trained to optimize the rate distortion objective function. In one example, the rate-distortion objective function ("performance measure") L may be given by:

$$L = R_{latent} + R_{hyper-prior} + \lambda \cdot E_{reconstruction} \qquad (15)$$

$$R_{latent} = -\log p_{\hat{y}} \qquad (16)$$

$$R_{hyper-code} = -\log p_{\hat{z}} \qquad (17)$$

$$E_{reconstruction} = |x - \hat{x}|_2^2 \qquad (18)$$

where $p_{\hat{y}}(\hat{y})$ refers to the probability of the code symbols representing the input data $\hat{y}$ under the conditional entropy model $p_{\hat{y}}(\cdot)$ used to entropy encode the code symbols, $p_{\hat{z}}(\hat{z})$ refers to the probability of the hyper-prior $\hat{z}$ under the entropy model $p_{\hat{z}}(\cdot)$ used to entropy encode the hyper-prior, $\lambda$ is a parameter determining the rate-distortion tradeoff, and $|x-\hat{x}|_2^2$ refers to a norm of a difference between the input data x and the reconstruction of the input data $\hat{x}$. In the rate distortion objective function described with reference to equations (15)-(18), $R_{latent}$ characterizes the size (e.g., in bits) of the compressed code symbols representing the input data, $R_{hyper-prior}$ characterizes the size (e.g., in bits) of the compressed hyper-prior, and $E_{reconstruction}$ characterizes the difference ("distortion") between the input data and the reconstruction of the input data.

Generally, a more complex hyper-prior can specify a more accurate conditional entropy model that enables the code symbols representing the input data to be compressed at a higher rate. However, increasing the complexity of the hyper-prior may cause the hyper-prior itself to be compressed at a lower rate. By jointly training the compression and decompression systems, a balance between: (i) the size of the compressed hyper-prior, and (ii) the increased compression rate from a more accurate entropy model, can be directly learned from training data.

In some implementations, the compression system and the decompression system do not use an encoder neural network or a decoder neural network. In these implementations, the compression system can generate the code symbols representing the input data by directly quantizing the input data, and the decompression system can generate the reconstruction of the input data as the result of decompressing the code symbols, as described above.

Figure 6:
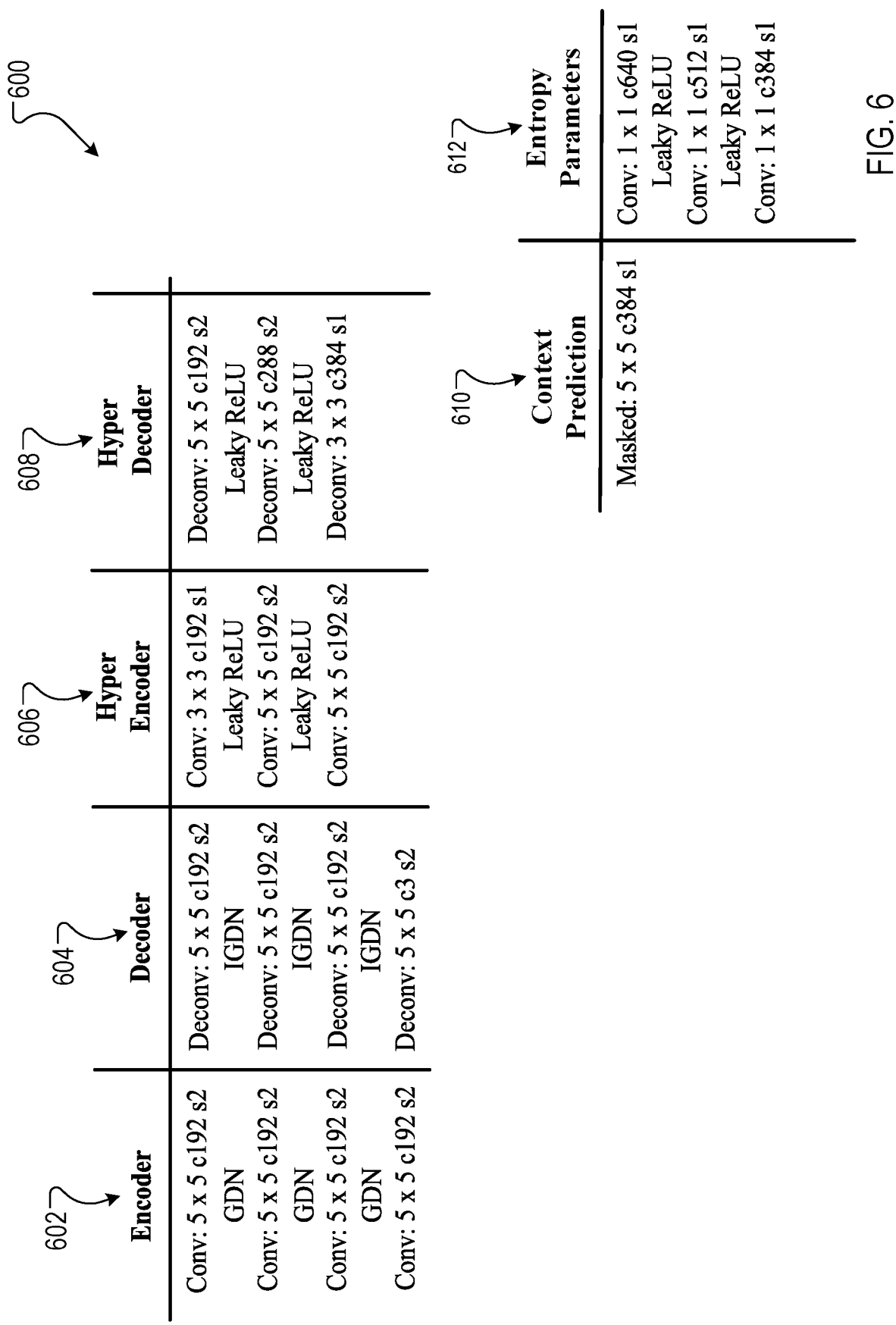
FIG. 6 shows a table that describes example architectures of integer neural networks that can be used by compression/decompression systems.

FIG. 6 shows a table 600 that describes example architectures of the integer neural networks used by the compression/decompression systems, in the particular case where the input data consists of images. More specifically, the table 600 describes example architectures of the encoder integer neural network 602, the decoder integer neural network 604, the hyper-encoder integer neural network 606, the hyper-decoder integer neural network 608, the context integer neural network 610, and the entropy model integer neural network 612.

Each row of the table 600 corresponds to a respective layer. Convolutional layers are specified with the "Cony"

prefix followed by kernel size, number of channels, and downsampling stride. For example, the first layer of the encoder integer neural network 602 uses 5×5 kernels with 192 channels and a stride of 2. The "Deconv" prefix corresponds to upsampled convolutions, while "Masked" corresponds to masked convolutions. GDN stands for generalized divisive normalization, and IGDN is the inverse of GDN.

In the example architecture described with reference to FIG. 6, the entropy model integer neural network uses 1×1 kernels. This architecture enables the entropy model integer neural network to generate a conditional entropy model having the property that the code symbol probability distribution corresponding to each code symbol does not depend on context outputs corresponding to subsequent code symbols (as described earlier). As another example, the same effect could be achieved by using masked convolutional kernels.

Figure 7:
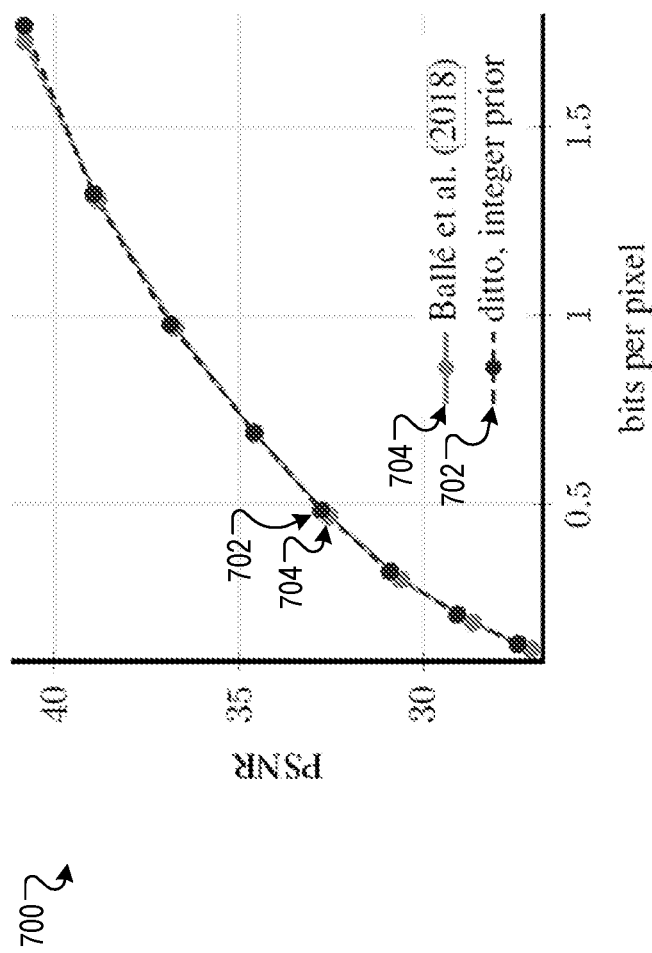
FIG. 7 illustrates a comparison of the rate-distortion performance of a compression/decompression system that uses: (i) integer neural networks, and (ii) neural networks that use floating point arithmetic.

FIG. 7 illustrates a comparison of the rate-distortion performance of a compression/decompression system that uses: (i) integer neural networks (702), and (ii) neural networks that implement floating point arithmetic (704). The horizontal axis of the graph 700 indicates the number of bits per pixel of the compressed data, and the vertical axis indicates the peak signal-to-noise ratio (PSNR) of the reconstructed data (left and up is better). It can be appreciated that using integer neural networks hardly changes the rate-distortion performance of the compression/decompression system, but enables the system to be reliably deployed across different hardware and software platforms.

Figure 8:
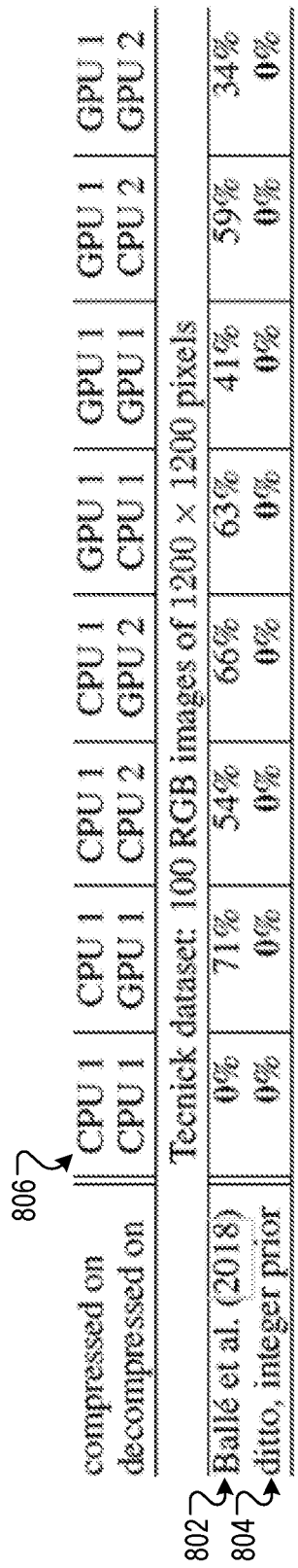
FIG. 8 is an example that compares the frequency of decompression failure rates due to floating point round-off error on a data set of RGB images when using: (i) neural networks that implement floating point arithmetic, and (ii) integer neural networks.

FIG. 8 is an example that compares the frequency of decompression failure rates due to floating point round-off error on a data set of RGB images when using: (i) neural networks that implement floating point arithmetic (802), and (ii) integer neural networks (804). When the compression and decompression systems are implemented on the same platform (e.g., 806), no decompression failures occur when using either system. When the compression and decompression systems are implemented on different platforms (e.g., different CPUs, different GPUs, or one on CPU and one on GPU), a substantial number of decompression failures occur when using neural networks that implement floating point arithmetic, while no decompression failures occur when using integer neural networks. It can be appreciated that using integer neural networks can greatly improve the reliability of compression/decompression systems that are implemented on different hardware or software platforms.

Figure 9:
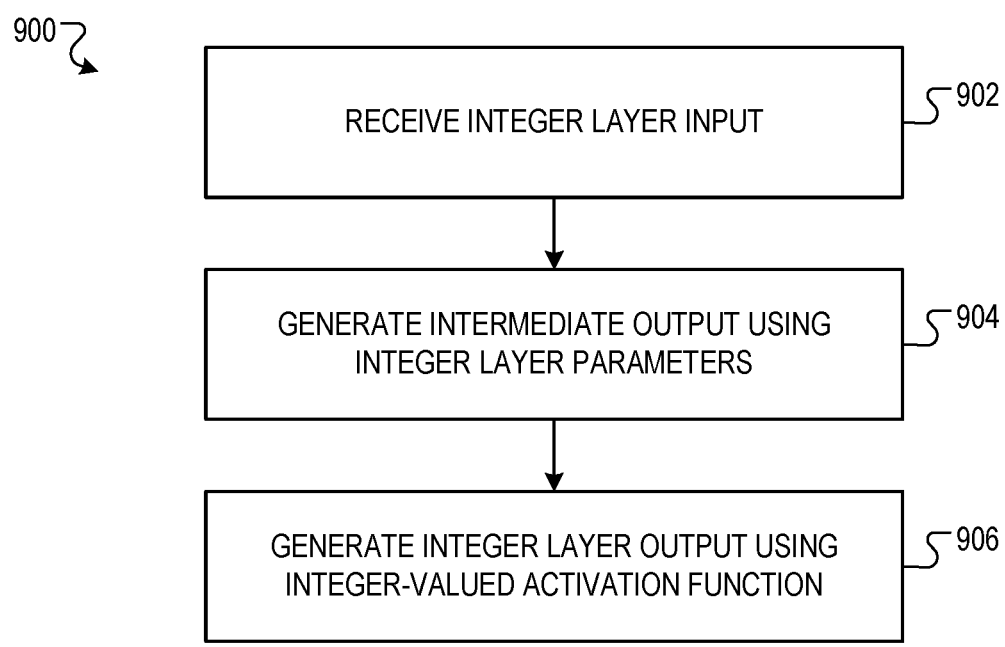
FIG. 9 is a flow diagram of an example process for processing an integer layer input to generate an integer layer output.

FIG. 9 is a flow diagram of an example process 900 for processing an integer layer input to generate an integer layer output. For convenience, the process 900 will be described as being performed by a system of one or more computers located in one or more locations. For example, an integer neural network, e.g., the integer neural network 100 of FIG. 1, appropriately programmed in accordance with this specification, can perform the process 900.

The system receives an integer layer input (902). The integer layer input may be represented as an ordered collection of integer values, e.g., a vector or matrix of integer values.

The system generates an intermediate result by processing the integer neural network layer input in accordance with the values of integer neural network layer parameters using integer-valued operations (904). For example, the system may generate a first intermediate output by multiplying the layer input by an integer-valued parameter matrix or by convolving the layer input by an integer-valued convolutional filter. The system may generate a second intermediate output by adding an integer-valued bias vector to the first intermediate result. The system may generate a third intermediate result by dividing each component of the second intermediate result by an integer-valued rescaling factor, where the division is performed using a rounding division operation. An example of generating an intermediate result is described with reference to equation (1). The integer-valued operations may be implemented using integer arithmetic or using a precomputed look-up table.

The system generates the layer output by applying an integer-valued activation function to the intermediate result (906). The integer-valued activation function may be, e.g., a quantized ReLU activation function (e.g., as described with reference to equation (4)), or a quantized hyperbolic tangent activation function (e.g., as described with reference to equation (5)). The activation function may be implemented, e.g., using integer arithmetic, or using a look-up table that defines a mapping from each integer value in a predetermined set of integer values to a respective precomputed integer output.

Figure 10:
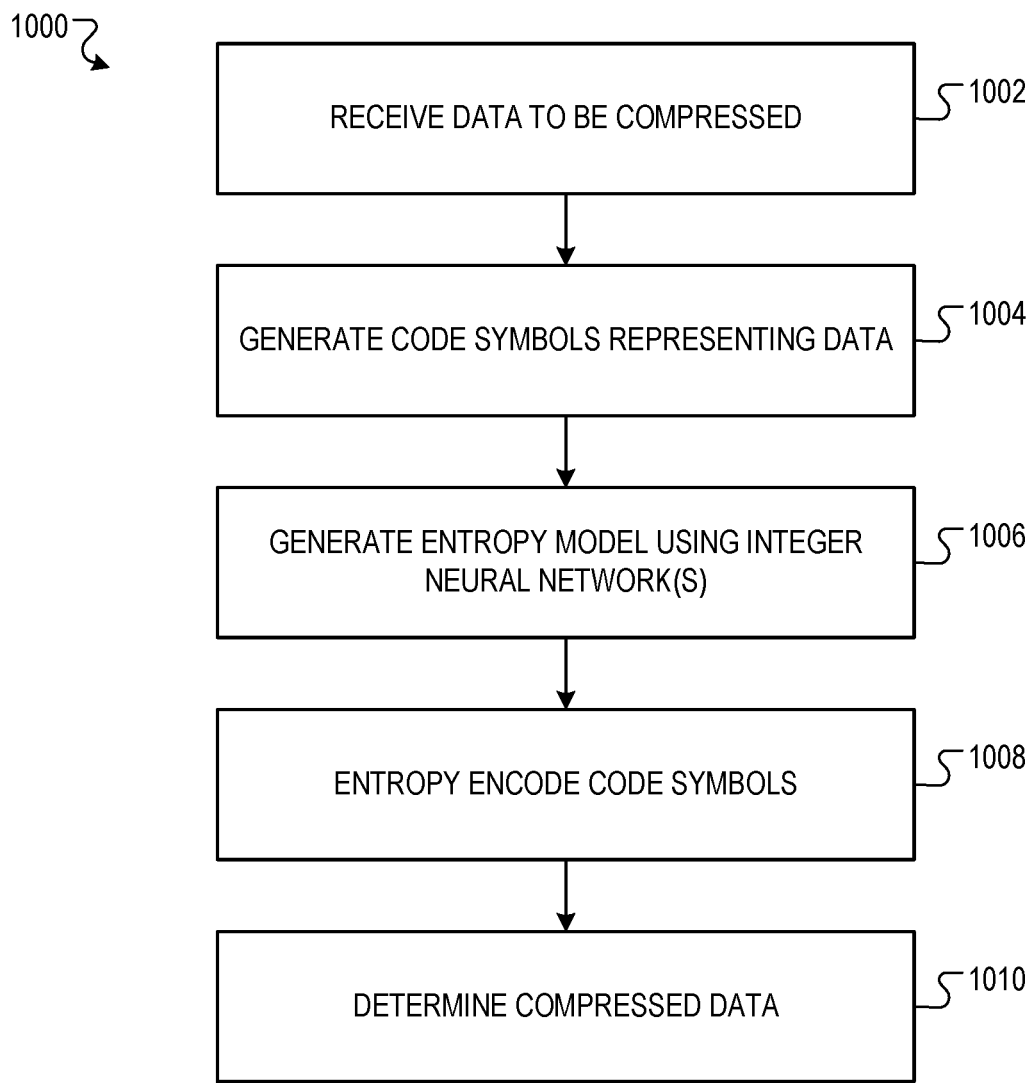
FIG. 10 is a flow diagram of an example process for processing compressing data using an entropy model that is computed using integer neural networks.

FIG. 10 is a flow diagram of an example process 1000 for compressing data using an entropy model that is computed using integer neural networks. For convenience, the process 1000 will be described as being performed by a system of one or more computers located in one or more locations. For example, a compression system, e.g., the compression system 400 of FIG. 4, appropriately programmed in accordance with this specification, can perform the process 4000.

The system receives data to be compressed (1002). The data may be any appropriate sort of data, e.g., image data, audio data, video data, or text data.

The system generates a representation of the data as an ordered collection (e.g., sequence) of code symbols (1004). In one example, the system quantizes a representation of the data as an ordered collection of floating point values to generate a representation of the data as an ordered collection of integer values (code symbols). In another example, after quantizing the data, the system may process the data using an encoder integer neural network, and identify the output of the encoder integer neural network as the code symbols representing the data. In this example, the output of the encoder integer neural network may be referred to as a "latent representation" of the data.

The system uses one or more integer neural networks to generate an entropy model that specifies a respective code symbol probability distribution for each component (code symbol) of the ordered collection of code symbols representing the data (1006). For example, the system may generate the code symbol probability distribution for each code symbol by processing an input including: (i) a respective integer representation of each of one or more components (code symbols) that precede the component (code symbol), (ii) an integer representation of one or more latent variables characterizing the data, or (iii) both, using one or more integer neural networks. The latent variables characterizing the data may be generated, e.g., by processing the code symbols representing the data using one or more other integer neural networks. An example of using integer neural networks to generate an entropy model is described in more detail with reference to FIG. 4. In the example described with reference to FIG. 4, the latent variables characterizing the data are referred to as a "hyper-prior".

The system entropy encodes the code symbols representing the data using the entropy model (1008). That is, the system generates an entropy encoded representation of the data using the respective code symbol probability distribution determined for each component (code symbol) of the ordered collection of code symbols representing the data.

The system can use any appropriate entropy encoding technique to entropy encode the code symbols, e.g., an arithmetic coding procedure.

The system determines the compressed representation of the data using the entropy encoded code symbols (1010). An example of determining a compressed representation of the data from the entropy encoded code symbols is described with reference to FIG. 4.

Figure 11:
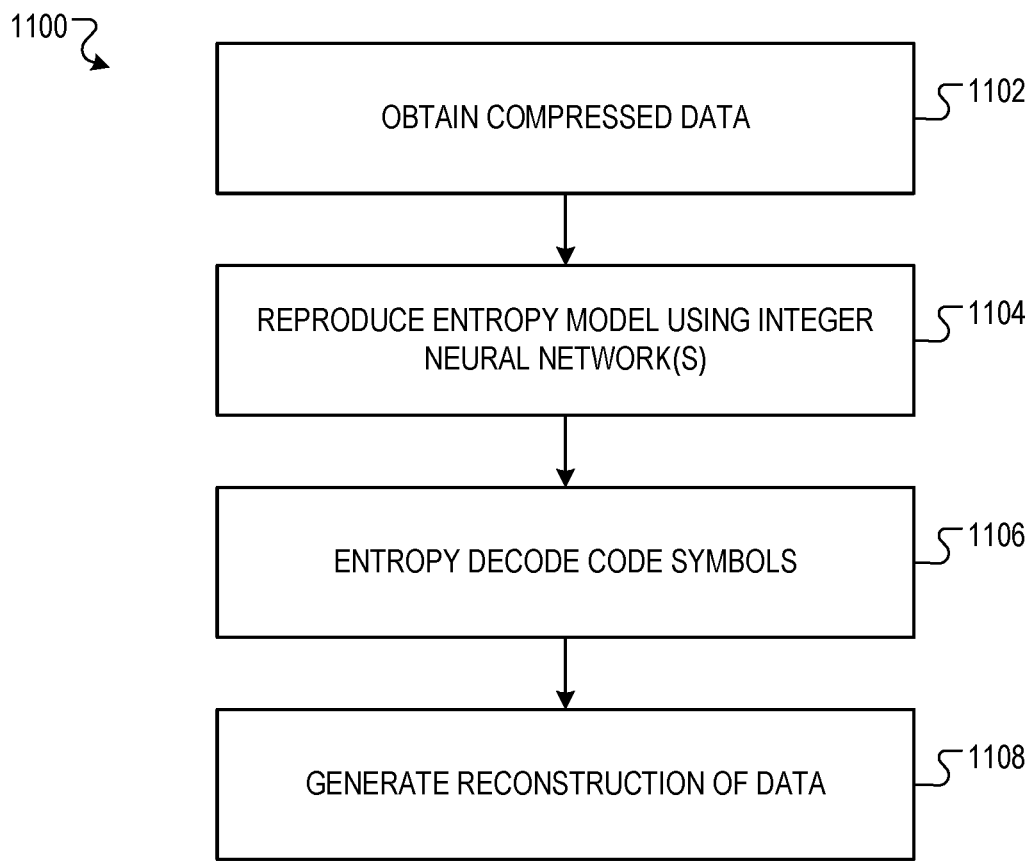
FIG. 11 is a flow diagram of an example process for reconstructing compressed data using an entropy model that is computed using integer neural networks.

FIG. 11 is a flow diagram of an example process 1100 for reconstructing compressed data using an entropy model that is computed using integer neural networks. For convenience, the process 1100 will be described as being performed by a system of one or more computers located in one or more locations. For example, a decompression system, e.g., the decompression system 500 of FIG. 5, appropriately programmed in accordance with this specification, can perform the process 1100.

The system obtains compressed data, e.g., from a data store (e.g., a logical data storage area or physical data storage device), or as a transmission over a data communication network (e.g., the Internet) (1102). Generally, the compressed data includes an entropy encoded representation of an ordered collection of code symbols representing the original data. An example process for generating compressed data is described with reference to FIG. 10.

The system uses one or more integer neural networks to reproduce the entropy model used to entropy encode the code symbols representing the data (1104). The entropy model specifies a respective code symbol probability distribution for each component (code symbol) of the ordered collection of code symbols representing the data. The system may generate the code symbol probability distribution for each component (code symbol) by processing an input including: (i) a respective integer representation of each of one or more components (code symbols) that precede the component (code symbol), (ii) an integer representation of one or more latent variables characterizing the data, or (iii) both, using one or more integer neural networks. An example of using integer neural networks to reproduce an entropy model is described in more detail with reference to FIG. 5. In the example described with reference to FIG. 5, the latent variables characterizing the data are referred to as a "hyper-prior" are included in the compressed data, i.e., in addition to the entropy encoded code symbols representing the data.

The system entropy decodes each component (code symbol) of the ordered collection of code symbols representing the data using the corresponding code symbol probability distribution specified by the entropy model (1106). The system may use, e.g., an arithmetic decoding or a Huffman decoding procedure to entropy decode the code symbols.

The system generates a reconstruction of the original data (1108). For example, the entropy decoded code symbols may themselves represent the reconstruction of the input data. As another example, the system may generate the reconstruction of the original data by processing the entropy decoded code symbols using a decoder integer neural network, e.g., as described with reference to FIG. 5.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for entropy encoding data which defines a sequence comprising a plurality of components, wherein each component specifies a respective code symbol from a predetermined discrete set of possible code symbols, the method comprising:

for each component of the plurality of components:

processing an input comprising: (i) a respective integer representation of each of one or more components of the data which precede the component in the sequence, (ii) an integer representation of one or more respective latent variables characterizing the data, or (iii) both, using an integer neural network to generate data defining a probability distribution over the predetermined set of possible code symbols for the component of the data, wherein:

the integer neural network has a plurality of integer neural network parameter values, and each of the plurality of integer neural network parameter values are integers;

the integer neural network comprises a plurality of integer neural network layers, each integer neural network layer is configured to process a respective integer neural network layer input to generate a respective integer neural network layer output, and processing an integer neural network layer input to generate an integer neural network layer output comprises:

generating an intermediate result by processing the integer neural network layer input in accordance with a plurality of integer neural network layer parameters using integer-valued operations; and generating the integer neural network layer output by applying an integer-valued activation function to the intermediate result; and generating an entropy encoded representation of the data using the respective probability distribution determined for each component of the plurality of components.

2. The method of claim 1, wherein the predetermined set of possible code symbols comprises a set of integer values.

3. The method of claim 1, wherein the data represents an image.

4. The method of claim 1, wherein the data represents a latent representation of an image generated by processing the image using a different integer neural network.

5. The method of claim 1, wherein generating an entropy encoded representation of the data using the respective probability distribution determined for each component of the plurality of components comprises:

using an arithmetic coding procedure to generate the entropy encoded representation of the data using the respective probability distribution determined for each component of the plurality of components.

6. The method of claim 1, wherein generating an intermediate result by processing the integer neural network layer input in accordance with a plurality of integer neural network layer parameters using integer-valued operations comprises:

generating a first intermediate result by multiplying the integer neural network layer input by an integer-valued parameter matrix or convolving the integer neural network layer input by an integer-valued convolutional filter.

7. The method of claim 6, further comprising:

generating a second intermediate result by adding an integer-valued bias vector to the first intermediate result.

8. The method of claim 7, further comprising:

generating a third intermediate result by dividing each component of the second intermediate result by an integer-valued rescaling factor, wherein the division is performed using a rounding division operation.

9. The method of claim 1, wherein the integer-valued activation function is defined by a look-up table that defines a mapping from each integer value in a predetermined set of integer values to a respective integer output.

10. The method of claim 1, wherein:

the plurality of integer neural network parameter values of the integer neural network are determined by a training procedure; and during training of the integer neural network:

the integer neural network parameter values are stored as floating point values, and the integer neural network parameter values stored as floating point values are rounded to integer values before being used in computations.

11. The method of claim 10, wherein rounding an integer neural network parameter value stored as a floating point value to an integer value comprises:

scaling the floating point value; and rounding the scaled floating point value to a nearest integer value.

12. The method of claim 11, wherein the floating point value is transformed by a parametrization mapping prior to being scaled, wherein the parametrization mapping r(·) is defined by:

$r(x) := \max(x, \sqrt{1+\epsilon^2})^2 - \epsilon^2.$

13. The method of claim 11, wherein if the integer neural network parameter value defines a parameter of a convolutional filter, the floating point value is scaled by a factor s defined by:

$s = (\max((-2^{K-1})^{-1}L, (2^{K-1}-1)^{-1}H), \epsilon)^{-1},$ where K is a bit-width of a kernel, L is a minimum of a set of floating point values defining parameters of the convolutional filter, H is a maximum of the set of floating point values defining the parameters of the convolutional filter, and $\epsilon$ is a positive constant.

14. The method of claim 11, wherein the floating point value is scaled based on a bit-width of a convolution kernel.

15. The method of claim 10, wherein the integer neural network comprises an integer neural network layer which is configured to generate the integer neural network layer output by applying an integer-valued activation to the intermediate result, wherein the integer-valued activation function performs a clipping operation, and wherein during the training of the integer neural network, a gradient of the activation function is replaced by a scaled generalized Gaussian probability density.

16. The method of claim 1, wherein the one or more respective latent variables characterizing the data are generated by processing the data using a neural network.

17. The method of claim 1, wherein for each of the plurality of components, the probability distribution over the predetermined set of code symbols for the component is a Gaussian distribution convolved with a uniform distribution, and the data defining the probability distribution over the predetermined set of code symbols for the component comprise respective mean and standard deviation parameters of the Gaussian distribution.

18. A system comprising one or more computers and one or more storage devices storing instructions that when executed by the one or more computers cause the one or more computers to perform operations for entropy encoding data which defines a sequence comprising a plurality of components, wherein each component specifies a respective code symbol from a predetermined discrete set of possible code symbols, the operations comprising:

for each component of the plurality of components:
processing an input comprising: (i) a respective integer representation of each of one or more components of the data which precede the component in the sequence, (ii) an integer representation of one or more respective latent variables characterizing the data, or (iii) both, using an integer neural network to generate data defining a probability distribution over the predetermined set of possible code symbols for the component of the data, wherein:
the integer neural network has a plurality of integer neural network parameter values, and each of the plurality of integer neural network parameter values are integers;
the integer neural network comprises a plurality of integer neural network layers, each integer neural network layer is configured to process a respective integer neural network layer input to generate a respective integer neural network layer output, and processing an integer neural network layer input to generate an integer neural network layer output comprises:
generating an intermediate result by processing the integer neural network layer input in accordance with a plurality of integer neural network layer parameters using integer-valued operations; and
generating the integer neural network layer output by applying an integer-valued activation function to the intermediate result; and
generating an entropy encoded representation of the data using the respective probability distribution determined for each component of the plurality of components.

19. One or more non-transitory computer storage media storing instructions that when executed by one or more computers cause the one or more computers to perform operations for entropy encoding data which defines a sequence comprising a plurality of components, wherein each component specifies a respective code symbol from a predetermined discrete set of possible code symbols, the operations comprising:

for each component of the plurality of components:
processing an input comprising: (i) a respective integer representation of each of one or more components of the data which precede the component in the sequence, (ii) an integer representation of one or more respective latent variables characterizing the data, or (iii) both, using an integer neural network to generate data defining a probability distribution over the predetermined set of possible code symbols for the component of the data, wherein:
the integer neural network has a plurality of integer neural network parameter values, and each of the plurality of integer neural network parameter values are integers;
the integer neural network comprises a plurality of integer neural network layers, each integer neural network layer is configured to process a respective integer neural network layer input to generate a respective integer neural network layer output, and processing an integer neural network layer input to generate an integer neural network layer output comprises:
generating an intermediate result by processing the integer neural network layer input in accordance with a plurality of integer neural network layer parameters using integer-valued operations; and
generating the integer neural network layer output by applying an integer-valued activation function to the intermediate result; and
generating an entropy encoded representation of the data using the respective probability distribution determined for each component of the plurality of components.

20. The non-transitory computer storage media of claim 19, wherein the predetermined set of possible code symbols comprises a set of integer values.

* * * * *